(12) United States Patent
Parker et al.

(10) Patent No.: US 8,714,187 B2
(45) Date of Patent: May 6, 2014

(54) RETENTION APPARATUS EMPLOYING WEDGE ELEMENT AND ENGAGEMENT ASSEMBLY FOR USE IN A NUCLEAR APPLICATION

(75) Inventors: Stephen K. Parker, Fremont, CA (US); Gerry L. Hodson, San Jose, CA (US); Alex Nisenbaum, San Jose, CA (US); Stephen J. Kaylor, Los Gatos, CA (US); Thanh Tu, Hayward, CA (US); Rodney Lum, Dublin, CA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 102 days.

(21) Appl. No.: 13/328,148

(22) Filed: Dec. 16, 2011

(65) Prior Publication Data
US 2012/0227834 A1    Sep. 13, 2012

Related U.S. Application Data

(60) Provisional application No. 61/424,084, filed on Dec. 17, 2010, provisional application No. 61/521,482, filed on Aug. 9, 2011.

(51) Int. Cl.
*F16L 3/00* (2006.01)
*F16L 3/22* (2006.01)

(52) U.S. Cl.
USPC .................................. 137/343; 248/68.1

(58) Field of Classification Search
USPC ............ 137/343, 356, 373; 248/512, 539, 65, 248/68.1, 74.1, 222.13, 229.11, 229.21
See application file for complete search history.

(56) References Cited

U.S. PATENT DOCUMENTS

2005/0072882 A1*  4/2005  Mong et al. .................. 248/74.1

* cited by examiner

*Primary Examiner* — John Rivell
*Assistant Examiner* — Kevin E Lynn
(74) *Attorney, Agent, or Firm* — Richard J. Coldren; Westinghouse Electric Company LLC

(57) ABSTRACT

An improved retention apparatus includes a wedge element that is disposed between a brace element and a flow element of a nuclear reactor system. The retention apparatus further includes an engagement assembly that is engaged with the wedge element and that is structured to engage at least one of the brace element and the flow element. The engagement assembly includes a deflectable element such as a spring that is structured to apply a retention force in an engagement direction of the wedge element to resist movement of the flow element during operation of the nuclear reactor system, such as movement due to vibration.

11 Claims, 6 Drawing Sheets

RETENTION APPARATUS EMPLOYING WEDGE ELEMENT AND ENGAGEMENT ASSEMBLY FOR USE IN A NUCLEAR APPLICATION

CROSS-REFERENCE TO RELATED APPLICATIONS

The instant application claims priority from U.S. Provisional Patent Application Ser. No. 61/424,084 filed Dec. 17, 2010, and entitled "BWR Jet Pump Assembly Wear Modification" and from U.S. Provisional Patent Application Ser. No. 61/521,482 filed Aug. 9, 2011, and entitled "BWR Jet Pump Assembly Wear Modification", the disclosures of which are incorporated herein by reference.

BACKGROUND

1. Field

The disclosed and claimed concept relates generally to nuclear power plants and, more particularly, to a retention apparatus that is employable in connection with a nuclear power plant and that includes a wedge element and an engagement assembly that retains the wedge element in a given position.

2. Description of Related Art

Numerous types of nuclear power plant configurations are known. One type of nuclear power plant is a boiling water reactor power plant that employs a number of jet pump assemblies in order to cause water to flow within the core of the reactor for purposes of agitation of the water and in order to generate steam. The steam is then converted into power such as electrical power.

As is generally understood, a jet pump assembly includes a riser carrying high velocity water, the flow of which is divided into two inlet mixers that are each in fluid communication with ambient water in the vicinity of the inlet mixers. The high velocity water that flows into the inlet mixers draws into the inlet mixers some of the ambient water that is in the vicinity of the inlet mixer, and the high velocity water and the ambient water become mixed. The mixed water exits each inlet mixer and flows into a corresponding diffuser that is affixed at its lower end to a support plate. The water flows out of the lower end of the diffuser and into the vicinity of the reactor core.

The outlet region of the inlet mixer is connected to the inlet portion of the diffuser with the use of a slip joint. A restrainer bracket that is affixed to the riser is employed to resist vibration of the inlet mixer by providing a wedge formed of a metallic material that is wedged in a space between the inlet mixer and the restrainer bracket and remains in place via gravity. Such wedges have not, however, been without limitation.

Due to the forces applied to the inlet mixers as a result of high velocity water flow, and additionally to heat and other factors, jet pump assemblies have occasionally experienced vibration during operation. Such vibration has caused the metal components that contact each other to behave as cutting tools that wear against one another. It thus would be desirable to provide a solution to resist vibration of jet pump assemblies.

SUMMARY

An improved retention apparatus includes a wedge element that is disposed between a brace element and a flow element of a nuclear reactor system. The retention apparatus further includes an engagement assembly that is engaged with the wedge element and that is structured to engage at least one of the brace element and the flow element. The engagement assembly includes a deflectable element such as a spring that is structured to apply a retention force in an engagement direction of the wedge element to resist movement of the flow element during operation of the nuclear reactor system, such as movement due to vibration.

Accordingly, an aspect of the disclosed and claimed concept is to provide an improved retention apparatus that employs a wedge element that is structured to be disposed between a brace element and a flow element and that further provides an engagement assembly that is engaged with the wedge element and that is structured to be engaged with at least one of the brace element and the flow element.

Another aspect of the disclosed and claimed concept is to provide such a retention apparatus wherein the engagement assembly includes a deflectable element such as a spring that is structured to be in a deflected state and to apply a retention force in an engagement direction to the wedge element to resist movement of the flow element.

Accordingly, an aspect of the disclosed and claimed concept is to provide an improved retention apparatus that is structured to be cooperable with a brace element and a flow element of a nuclear reactor system to resist movement of the flow element. The retention apparatus can be generally stated as including a wedge element and an engagement assembly. The wedge element has a first surface and a second surface oriented oblique to one another. The wedge element is structured to be movable in an engagement direction to cause at least one of the first and second surfaces to engage at least one of the flow element and the brace element. The engagement assembly is engaged with the wedge element and is structured to be engaged with at least one of the brace element and the flow element. The engagement assembly can be generally stated as including a deflectable element that is structured to be in a deflected state and to apply a retention force in the engagement direction to the wedge element when the engagement assembly is engaged with the at least one of the brace element and the flow element

BRIEF DESCRIPTION OF THE DRAWINGS

A further understanding of the disclosed and claimed concept can be gained from the following Description of the Preferred Embodiment when read in conjunction with the accompanying drawings in which:

Similar numerals refer to similar parts through the specification.

DESCRIPTION OF THE PREFERRED EMBODIMENT

Figure 1:
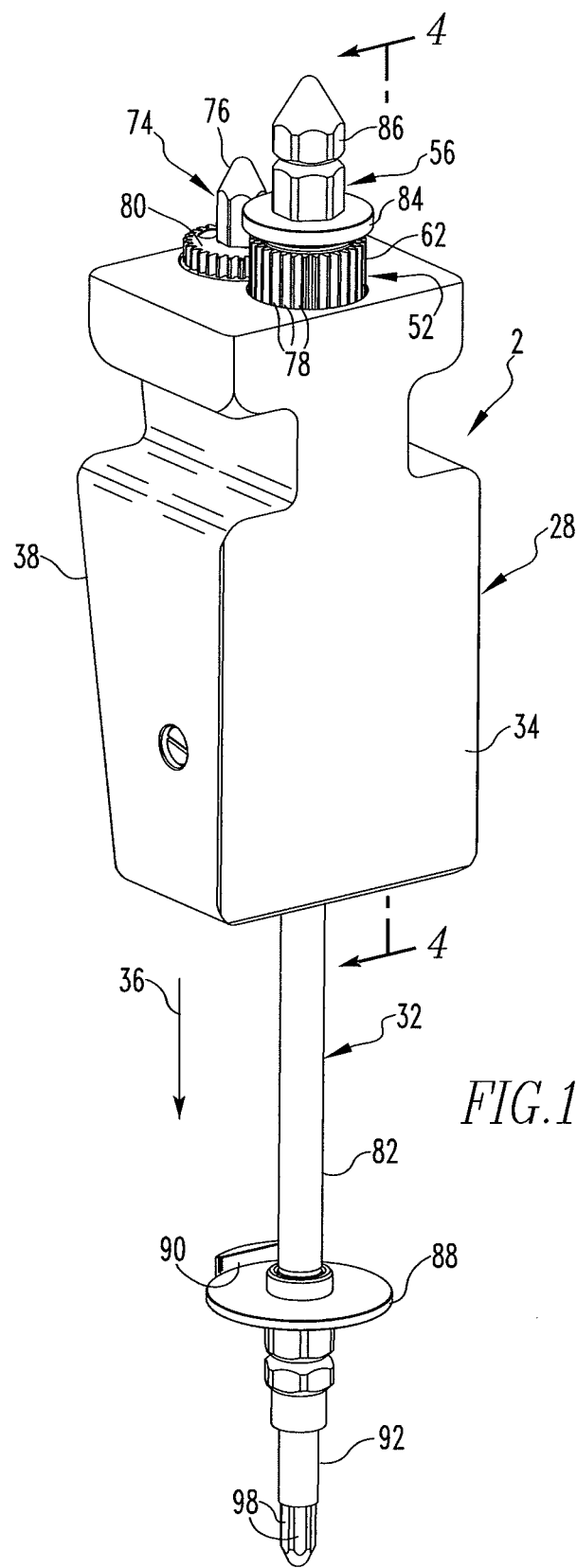
FIG. 1 is a perspective view of an improved retention apparatus in accordance with the disclosed and claimed concept.

An improved retention apparatus 2 in accordance with the disclosed and claimed concept is depicted generally in FIG. 1.

Figure 2:
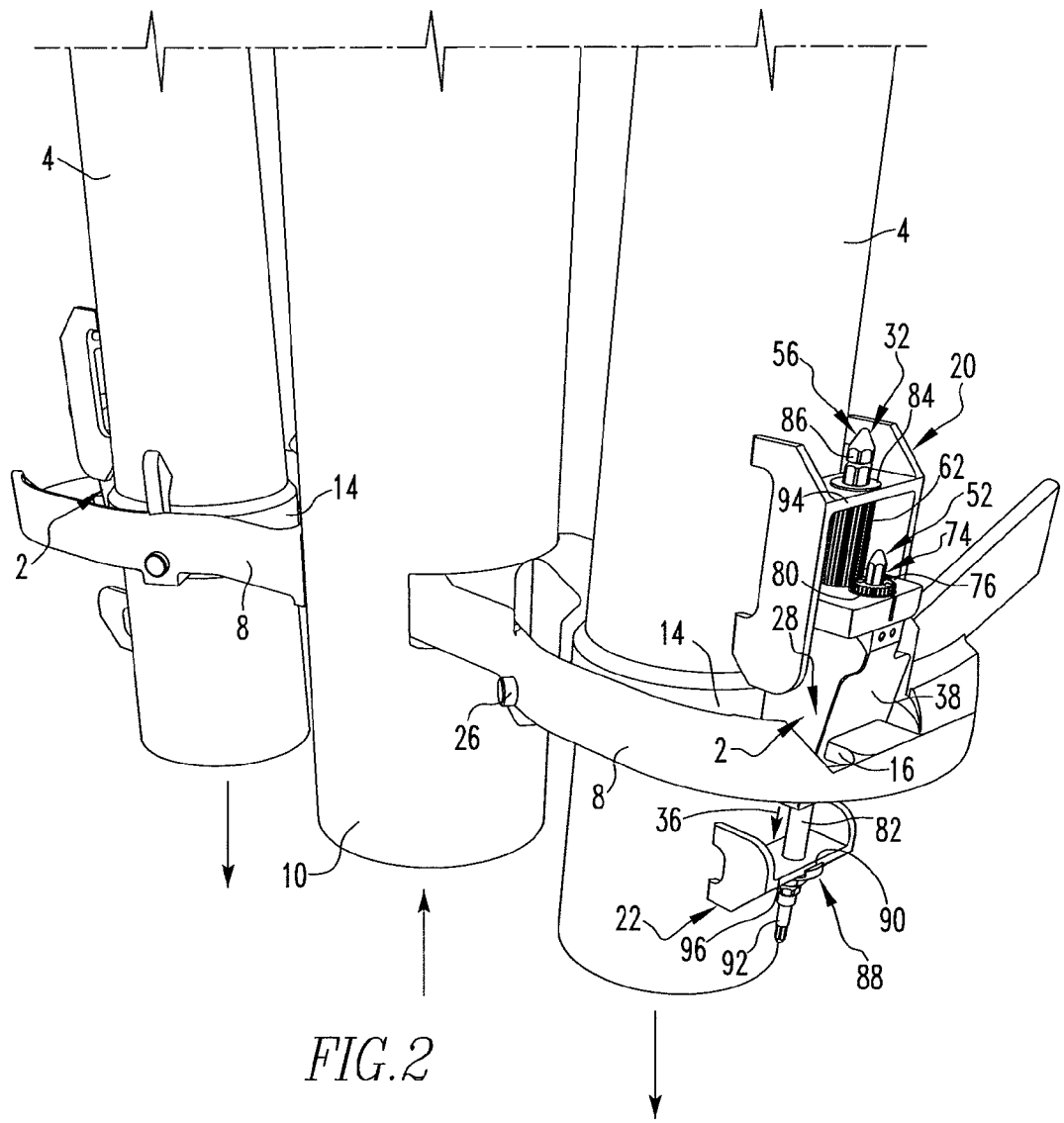
FIG. 2 is front a perspective depiction of the retention apparatus in an installed condition disposed between a flow element and a brace element of a nuclear reactor apparatus.

The retention apparatus 2 is advantageously employable, as is depicted generally in FIG. 2, to resist vibration of an inlet mixer 4, which is a flow element that carries a flow of water as part of a nuclear apparatus. The retention apparatus 2 is situated between the inlet mixer 4 and a restrainer bracket 8 that is affixed to a jet pump riser 10 which carries a high velocity flow of water that is delivered to the inlet mixers 4. The arrow in FIG. 2 that points in a generally upward direction depicts the flow of water in the jet pump riser 10 during normal operation of the nuclear apparatus. The arrows pointing in the downward direction in FIG. 2 depict the flow of water after it has left the jet pump riser 10 and is flowing in the inlet mixers 4, of which two are shown in FIG. 2, during normal operation of the nuclear apparatus. Each inlet mixer 4 employs a retention apparatus 2 to resist vibration of the inlet mixer 4 during operation of the nuclear apparatus.

The inlet mixer 4 includes an annular belly band 14 formed thereon which is engaged by the retention apparatus 2. The restrainer bracket 8 includes a protruding lug 16 that is likewise engaged by the retention apparatus 2 such that the retention apparatus 2, in use, is interposed between the belly band 14 and the lug 16.

As can be understood from FIG. 2, the inlet mixer 4 has an upper bracket 20 and a lower bracket 22 affixed thereto and situated above and below, respectively, the belly band 14 from the perspective of FIG. 2. The retention apparatus 2 extends between the upper and lower brackets 20 and 22.

Figure 3:
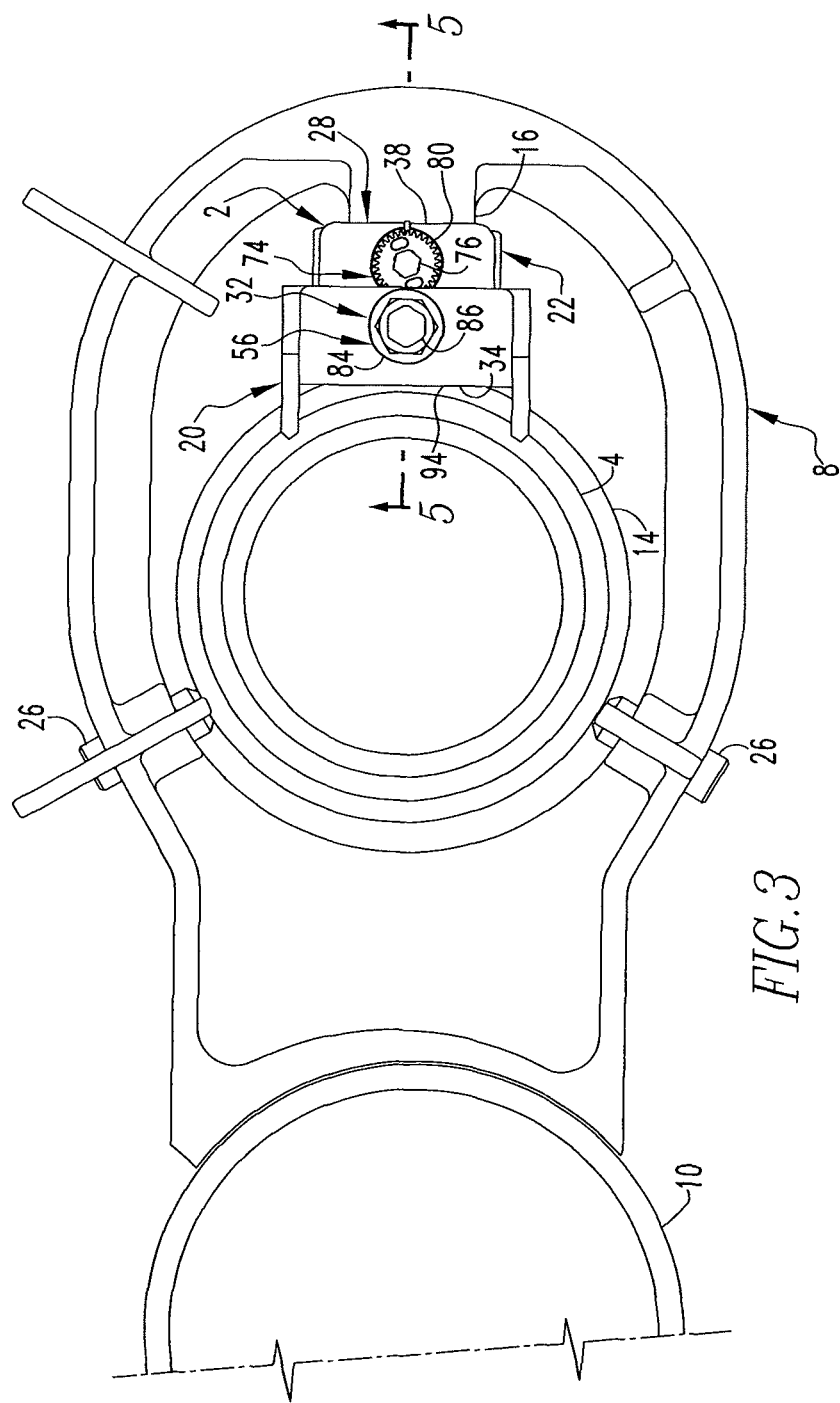
FIG. 3 is a top plan view of a portion of FIG. 2.

In addition to the retention apparatus 2 that is engaged with the inlet mixer 4, a pair of set screws 26 are also engaged with the inlet mixer 4 such that the retention apparatus 2 and the two set screws 26 provide three-point retention of the inlet mixer 4. That is, and as can be seen in FIG. 3, the two set screws 26 are situated approximately one hundred twenty degrees (120°) apart from one another and apart from the retention apparatus 2 about the circumference of the belly band 14. The engagement of the retention apparatus 2 between the inlet mixer 4 and the restrainer bracket 8 thus causes the inlet mixer 4 to be engaged with the two set screws 26 to resist vibration of the inlet mixer 4.

As can be seen in FIG. 1, the retention apparatus 2 can be said to include a wedge element 28 and an engagement assembly 32 that are connected together. The wedge element 28 itself is formed to include a first surface 34 and a second surface 38 that are situated at the exterior of the wedge element 28 and which are oriented oblique with one another. The wedge element 28 is thus movable in an engagement direction indicated generally with the arrow 36 to cause the first surface 34 to engage the belly band 14 of the inlet mixer 4 and to cause the second surface 38 to engage the lug 16 of the restrainer bracket 8.

Figure 4:
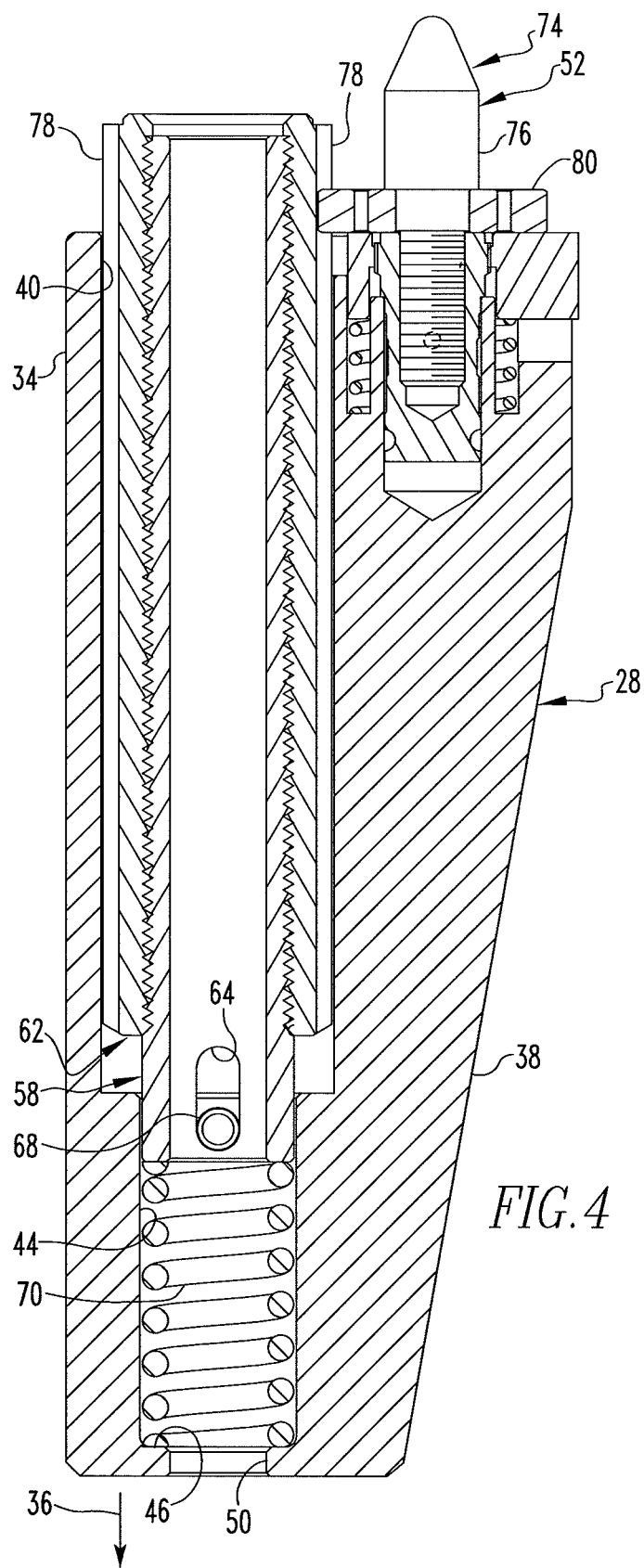
FIG. 4 is a sectional view as taken along line 4-4 of FIG. 1.
Figure 5:
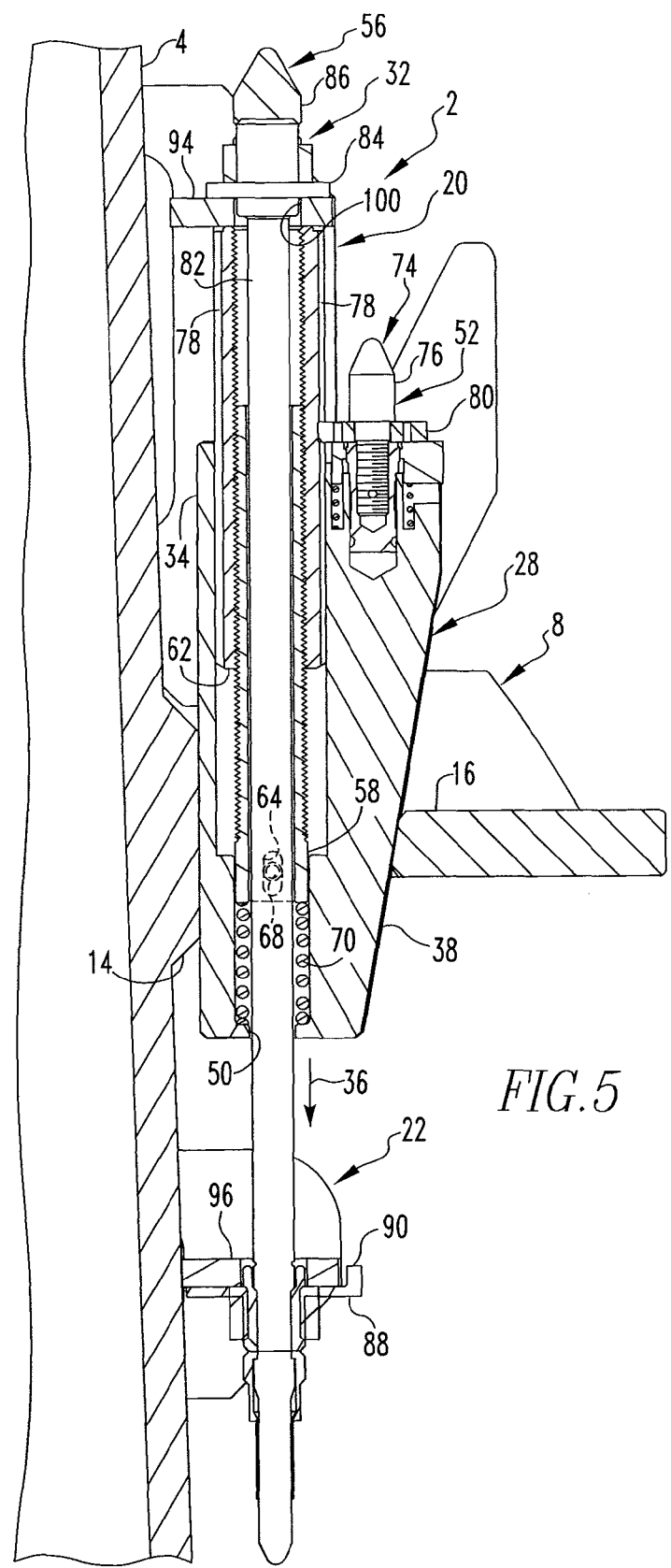
FIG. 5 is a sectional view as taken along line 5-5 of FIG. 3.

The wedge element 28 can be seen in FIGS. 4 and 5 to have a cylindrical first channel 40 and a cylindrical second channel 44 formed therein and oriented concentric with one another. In the depicted exemplary embodiment, the first channel 40 is of a greater diameter than the second channel 44. The second channel 44 terminates in an annular seat 46 that has a hole 50 formed therein.

As can be further understood from FIGS. 4 and 5, the engagement assembly 32 is received, at least in part, in the first and second channels 40 and 44, and the longitudinal extent of the first and second channels 40 and 44 can be seen to be aligned with the first surface 34. It thus can be said that the second surface 38 is ramped with respect to the first surface 34, although other descriptive relationships can be said to exist.

The engagement assembly 32 can be said to include a tensioning apparatus 52 and a rod apparatus 56. As will be set forth in greater detail below, the rod apparatus 56 is installed to extend between the upper and lower brackets 20 and 22, and the wedge element 28 is generally freely movable along the rod apparatus 56. However, the tensioning apparatus 52 is engageable with the upper bracket 20 to cause the wedge element 28 to compressively engage between the inlet mixer 4 and the restrainer bracket 8 to resist vibration of the inlet mixer 4. Thus, while the wedge element 28 is otherwise freely movable along the rod apparatus 56, such movement is limited by the engagement of the tensioning apparatus between the wedge element 28 and the upper bracket 20.

Figure 6:
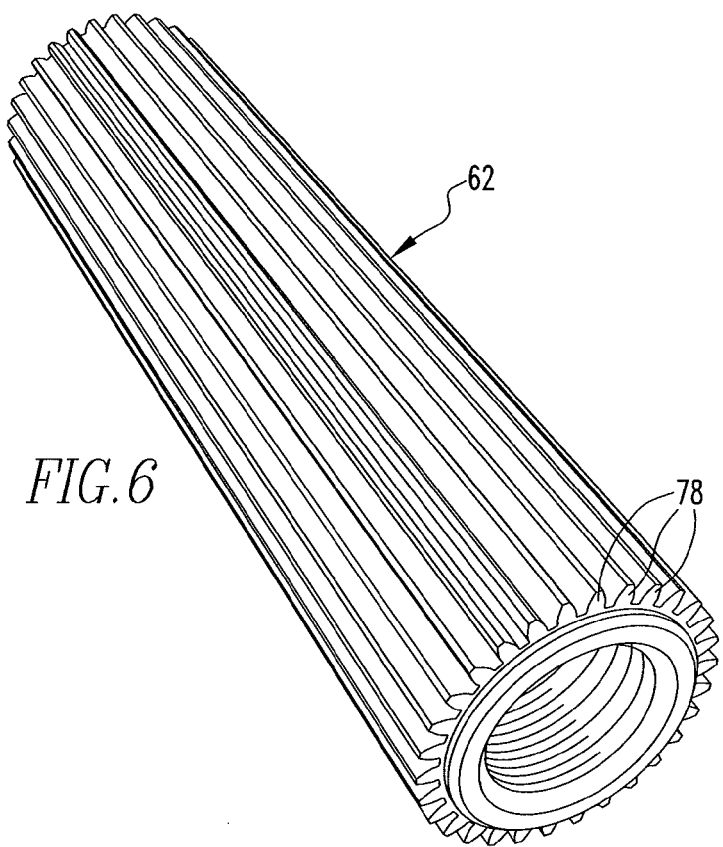
FIG. 6 is a perspective view of a sleeve of an engagement assembly of the retention apparatus of FIG. 1.
Figure 7:
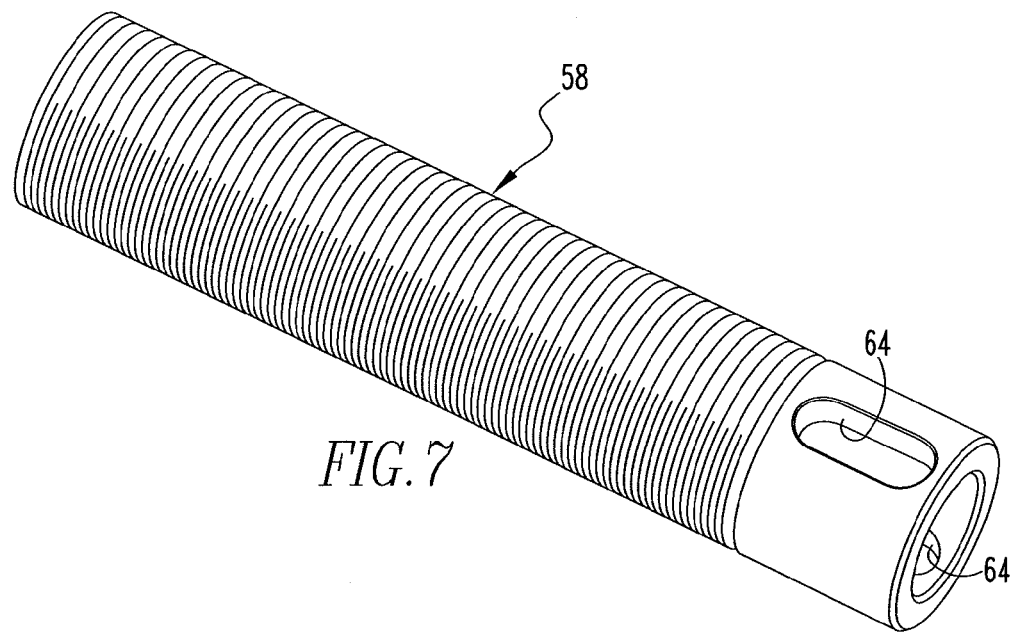
FIG. 7 is a perspective view of a mandrel of an engagement assembly of the retention apparatus of FIG. 1.

The tensioning apparatus 52 is depicted in FIGS. 4 and 5, it being noted that the rod apparatus 56 is not depicted in FIG. 4 in order to better illustrate the tensioning apparatus 52. The tensioning apparatus 52 can be said to include a mandrel 58 and a sleeve 62 that are additionally depicted in FIGS. 7 and 6, respectively, and which are threadably cooperable with one another. That is, the mandrel 58 has a number of helical threads formed on a cylindrical outer surface thereof, and the sleeve 62 has a number of corresponding helical threads formed on a cylindrical inner surface thereof. As employed herein, the expression "a number of" and variations thereof shall refer broadly any non-zero quantity, including a quantity of one. The mandrel 58 has formed therein a pair of elongated slots 64 that are configured to receive therein a pair of pins 68 that are seated in the wedge element 28 at the second channel 44. The pins 68 received in the slots 64 resist rotation of the mandrel 58 while permitting translation thereof within the limits of movement of the pins 68 in the elongated slots 64.

The tensioning apparatus 52 further includes a deflectable element in the exemplary form of a coil spring 70 that is situated in the second channel 44 between the seat 46 and an end of the mandrel 58 that is adjacent the slots 64. In the arrangement depicted generally in FIG. 4, i.e., with the pins 68 engaged with the ends of the slots 64, the coil spring 70 is of at least a minimal level of compression, i.e., preload, with the coil spring 70 being interposed between the seat 46 and the mandrel 58.

The tensioning apparatus 52 can be said to further include a rotation apparatus 74 that is configured to rotate the sleeve 62 with respect to the mandrel 58 and to thereby cause the sleeve 62 to translate longitudinally with respect to the mandrel 58. More specifically, the rotation apparatus 74 can be said to include a hex head 76 that is connected with a gear 80 having a set of circumferentially distributed teeth. As can be understood from FIG. 6, the sleeve 62 has a plurality of elongated teeth 78 of an involute profile formed longitudinally thereon that are engageable by the gear 80. The elongated nature of the teeth 78 enables the sleeve 62 to translate along its longitudinal direction with respect to the gear 80, which remains rotatably disposed on the wedge element 28, while maintaining engagement of the gear 80 with the teeth 78. As will set forth in greater detail below, the retention apparatus 2 is mounted between the inlet mixer 4 and the restrainer bracket 8 by rotating the rotation apparatus 74 sufficiently to cause the sleeve 62 to function as an abutment element to engage the upper bracket 20 to cause the mandrel 58, which is a threaded element, to translate and engage the coil spring 70 to apply a retention force in the engagement direction 36 to retain the retention apparatus compressively engaged between the inlet mixer 4 and restrainer bracket 8.

The rod apparatus 56 can be said to include an elongated rod 82 having an annular flange 84 and a hex head 86 formed at one end thereof. The rod apparatus 56 further includes a latch element 88 that is threadable onto the rod 82 at an end thereof opposite the flange 84 and the hex head 86. The latch element is formed with an upturned lip 90 that engages an edge of the lower bracket 22. The latch element 88 further includes a crimp end 92 that is deformable into engagement with a number of flats 98 that are formed on the rod 82 adjacent the threading at the end thereof opposite the flange 84 and the hex head 86.

The rod apparatus 56 is mountable between an upper buttress 94 of the upper bracket 20 and a lower buttress 96 of the lower bracket 22. The upper and lower buttresses 94 and 96 are plates of metal that are generally horizontally disposed and are oriented substantially parallel with one another. The rod 82 is received in a hole 100 formed in the upper buttress 94, and the flange 84 is situated against an upper surface of the upper buttress 94. The rod 82 is received through the aligned longitudinal openings in the sleeve 62, the mandrel 58, and the coil spring 70 and is further received through the hole 50 at the bottom of the wedge element 28. The latch element 88 is then threaded onto the threading formed on the rod 82 until the lip 90 engages a frontal edge of the lower buttress 96. The crimp end 92 of the latch element 88 is then deformed at a number of locations to cause it to engage the flats 98, which will resist unthreading of the latch element 88 from the rod 82. In such a configuration, i.e., without the tensioning apparatus being engaged with the upper bracket 20, the wedge element 28 can be said to be freely movable along the length of the rod 82 situated between the upper and lower brackets 20 and 22.

Final installation of the retention apparatus 2 involves rotation of the hex head 76 to cause the gear 80 connected therewith to operable engage the teeth 78 to cause the sleeve 62 to thread with respect to the mandrel 58 in an expansion direction. Since the mandrel 58 is resisted from rotation by the pins 68 received in the slots 64, rotation of the sleeve 62 results in the sleeve 62 rotating about the mandrel 58 and translating in an upward direction from the perspective of FIGS. 4 and 5. Rotation of the hex head 76 in an opposite direction causes the sleeve 62 to translate with respect to the mandrel 58 in a downward direction from the perspective of FIGS. 4 and 5, which is a contraction direction. The hex head 76 is advantageously offset from the longitudinal axis of the mandrel 58 and sleeve 62, and thus is likewise also offset from the rod apparatus 56, which permits a rotational tool such as a hexagonal socket or other type of spanner tool to be received from above the retention apparatus 2 and to be engaged with the hex head 76 in order to rotate it.

The hex head 76 is rotated to cause the sleeve 68 to expand sufficiently until it compressively engages an underside of the upper buttress 94. In such a situation, the sleeve 62 cannot move any farther in an upward direction since it is engaged with an underside of the upper buttress 94, and further rotation of the sleeve 62 thus results in translation of the mandrel 58 in a direction to cause the coil spring 70 to become further compressed, which is a downward direction from the perspective of FIGS. 4 and 5. As such, a compressive load by the sleeve 62 on the upper buttress 94 is transferred via the mandrel 58 to the coil spring 70 which applies a compressive retention force on the wedge element 28 in the engagement direction 36. In fact, the engagement direction arrow indicated at the numeral 36 can be said to represent the retention force on the wedge element 28. Such retention force 36 causes the first and second surfaces 34 and 38 to engage the belly band 14 and the lug 16, respectively, until the belly band 14 is engaged in a state of equipoise between the wedge element 28 and the two set screws 26.

The hex head 76 is rotated sufficiently to cause the coil spring 70 to maintain a predetermined compressive load between the mandrel 58 and the seat 46 of the wedge element 28, which results in the aforementioned retention force on the wedge element 28. An exemplary predetermined load may be on the order of one hundred fifty pounds-force (150 $lb_f$), although other preload forces may be appropriate depending upon the particular application. The preload force likely will be achieved when the pins 68 are situated roughly midway along the longitudinal extent of the slots 64 in order to cause any vibration that may occur in the inlet mixer 4 to be absorbed on a transient basis as compression and expansion of the coil spring 70.

As can be understood from FIGS. 4 and 5, the mandrel 58 and the sleeve 62 threadably at least partially engage one another within the interior of the wedge element 28. Such engagement further permits the coil spring 70 to be retained within the interior of the wedge element 28 while further being engaged by the mandrel 58, which transmits the force of the sleeve 62 on the upper buttress 94 into the coil spring 70 and thus onto the wedge element 28 as the retention force in the engagement direction 36. The tensioning apparatus 52 thus advantageously retains the retention apparatus 2 engaged between the inlet mixer 4 and the restrainer bracket, which advantageously resists vibration-induced wear of the inlet mixer during operation of the nuclear apparatus. That is, vibration is desirably reduce or avoided altogether. To the extent that some level of vibration of the inlet mixer 4 may exist, such vibration is absorbed and damped by the coil spring 70 with its retention force being applied to the wedge element 28 and thus to the inlet mixer 4. Thus, any vibration that may occur results in less wear of the inlet mixer 4 and/or the other components described above.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A retention apparatus structured to be cooperable with a brace element and a flow element of a nuclear reactor system to resist movement of the flow element, the retention apparatus comprising:
   a wedge element having a first surface and a second surface oriented oblique to one another, the wedge element being structured to be movable in an engagement direction to cause at least one of the first and second surfaces to engage at least one of the flow element and the brace element;
   an engagement assembly engaged with the wedge element and being structured to be engaged with at least one of the brace element and the flow element, the engagement assembly comprising a deflectable element that is structured to be in a deflected state and to apply a retention force in the engagement direction to the wedge element when the engagement assembly is engaged with the at least one of the brace element and the flow element.

2. The retention apparatus of claim 1 wherein the wedge element is structured to be interposed between the brace element and the flow element, with one of the first and second surfaces being structured to be engaged with the brace element, and with the other of the first and second surfaces being structured to be engaged with the flow element.

3. The retention apparatus of claim 1 wherein the deflectable element is an elongated coil spring, and wherein the engagement assembly comprises a tensioning apparatus that comprises an elongated abutment element that is structured to engage the at least one of the brace element and the flow element, the coil spring and the abutment element being oriented substantially parallel with one another.

4. The retention apparatus of claim 3 wherein at least a portion of the tensioning apparatus is structured to be engaged with at least a portion of the coil spring, the tensioning apparatus being structured to be movable in one direction to increase the retention force and movable in another direction to reduce the retention force.

5. The retention apparatus of claim 4 wherein the at least portion of the tensioning apparatus is structured to be engaged between the at least portion of the coil spring and at least a portion of the abutment element, the tensioning apparatus being structured to be moved in an expansion direction when moving in the one direction and being structured to be moved in a contraction direction when moving in the another direction.

6. The retention apparatus of claim 5 wherein the at least portion of the tensioning apparatus comprises a threaded element that is threadable cooperably with the abutment element to move the tensioning apparatus in the expansion and contraction directions.

7. The retention apparatus of claim 6 wherein the threaded element has a slot formed therein, and wherein the tensioning apparatus further comprises a pin that is mounted to the wedge element and that is received in the slot, the pin in the slot being structured to resist rotation of the threaded element while permitting translation thereof.

8. The retention apparatus of claim 6 wherein the coil spring and the threaded element are structured to engage one another within an interior region of the wedge element.

9. The retention apparatus of claim 6 wherein the engagement assembly further comprises an elongated rod structured to be engaged with the brace element, the wedge element being structured to be movably disposed on the rod, and wherein the abutment element, the threaded element, and the coil spring each have a longitudinal opening formed therein that is structured to receive therein at least a portion of the rod.

10. The retention apparatus of claim 6 wherein the abutment element has a plurality of gear teeth formed on a cylindrical outer surface thereof, the gear teeth extending in a direction parallel with a direction of elongation of the abutment element.

11. The retention apparatus of claim 10 wherein the tensioning apparatus further comprises a rotation apparatus that is structured to be engaged with the gear teeth and which is structured to be operable to rotate the abutment element with respect to the threaded element to move the tensioning apparatus in the expansion and contraction directions.

\* \* \* \* \*